3,439,019
N-BENZOYLOXYMETHYL BENZAMIDES AND
THEIR PREPARATION
Lewis H. Sarett, Princeton, Clarence S. Rooney, Bridgewater Township, and Louis H. Peterson, Woodbridge, N.J., assignors to Merck & Co., Inc., Rahway, N.J., a corporation of New Jersey
No Drawing. Filed Jan. 19, 1966, Ser. No. 521,502
Int. Cl. C07c *103/84, 67/00;* A61k *27/00*
U.S. Cl. 260—472    10 Claims

ABSTRACT OF THE DISCLOSURE

Anticoccidial N-benzoyloxymethyl benzamides are prepared by reacting a 3,5-dinitrobenzamidomethyl pyridinium chloride with a 2-alkoxy-(or alkenoxy)-4-substituted benzoic acid.

---

This invention relates generally to new chemical compounds. More specifically, it is concerned with chemical compounds which are useful in the prevention and the cure of coccidiosis. Still more particularly, it is concerned with a series of new N-benzoyloxymethyl benzamides which are effective in controlling coccidiosis when fed in small amounts to poultry. Still more specifically, it relates to N-benzoyloxymethyl benzamides, and with methods for preparing such compounds. It is further concerned with novel compositions containing such substances.

Coccidiosis is a common and widespread poultry disease caused by several species of protozoan parasites of the genus Eimeria, such as *E. tenella, E. necatrix, E. acervulina, E. maxima, E. hagani* and *E. brunetti*. *E. tenella* is the causative agent of a severe and often fatal infection of the ceca of chickens which is manifested by extensive hemorrhage, accumulation of blood in the ceca, and the passage of blood in the droppings. *E. necatrix* as well as certain other species attack the small intestine of the chick causing what is known as intestinal coccidiosis. Related species of coccidia such as *E. melagridis* and *E. adenoides* are causative organisms of coccidiosis in turkeys. When left untreated, the severe forms of coccidiosis lead to poor weight gain, reduced feed efficiency and high mortality in fowl. The elimination or control of coccidiosis is, therefore, of paramount importance in the poultry raising industry.

It has now been found that certain N-benzoyloxymethyl benzamides are very highly active against the protozoa responsible for coccidiosis. An object of the present invention is to provide such novel compounds. Another object is to provide a synthesis of such substances. A further object is the provision of animal feeds and feed supplements and of water soluble compositions containing these N-benzoyloxymethyl benzamides. Other objects will be apparent from the following discussion of our invention.

The anticoccidial compounds within the scope of the present invention may be represented by the general formula:

$$O_2N-\underset{NO_2}{\underset{|}{\bigcirc}}-CONHCH_2OCO-\underset{OR_1}{\underset{|}{\bigcirc}}-X$$

I wherein R is hydrogen or a lower alkyl radical, $R_1$ is a lower alkyl or lower alkenyl radical and X is nitro, loweralkylamino, diloweralkylamino or acetamido radicals.

The N-benzoyloxymethyl benzamides I of the present invention are prepared by reacting a 3,5-dinitrobenzamidomethyl pyridinium chloride II with a 2-alkoxy or alkenoxy-4-substituted benzoicacid III. If desired, the reaction may be carried out in an alkaline medium. The reaction may be illustrated as follows:

<chemical scheme showing II + III → I> wherein R, $R_1$ and X are as defined above.

Also in accordance with the present invention, the starting 3,5-dinitrobenzamidomethyl pyridinium II is obtained by formylating a 3,5-dinitrocarboxamide IV to produce the corresponding hydroxymethyl V which is then reacted with pyridine in the presence of a compound which will readily supply chloride ions to give the 3,5-dinitrobenzamidomethyl pyridinium chloride II. This series of reactions may be illustrated as follows:

<chemical scheme IV → V → II>

More specifically, the step of formylating the 3,5-dinitrocarboxamide IV comprised carrying out the reaction in the presence of a solvent such as dimethylformamide, acetone, alcohols, dioxane and the like with dimethylformamide being the preferred solvent. The reaction with formaldehyde is carried out at a temperature range of from 50 to 100° C. with a preferred range being from 80 to 100° C. for a period of up to five hours. The corresponding hydroxymethyl Compound V may be crystalized by addition of water.

The next step which comprises the reaction of the hydroxymethyl Compound V with pyridine is carried out in the presence of a compound which will readily supply chloride ions, for example, hydrochloric acid, pyridine hydrochloride and benzoylchloride. The amount of chlorine ion supplying compound may be in slight molar excess, though this is not critical. The amount of pyridine can also be in slight molar excess. The solvent used may be dimethylformamide, aromatic hydrocarbons, ethers, acetone, alcohols, dioxane and the like. The reaction temperature may vary within the range of from 50 to 100° C. with a range of 70 to 90° C. being preferred and the reaction may be carried out for a period of up to five hours.

The main reaction of a 3,5-dinitrobenzamidomethyl pyridinium II with a 2-alkoxy or 2-alkenoxy-4-substituted benzoic acid III is preferably carried in a basic alkali medium by using alkali or alkaline earth metal hydroxide, hydrides, carbonates, dicarbonates and the like and in the presence of an inert solvent, for example, acetone, dimethylformamide, dimethoxyethane, aromatic hydrocarbons, ethers, tetrahydrofuran and the like. The reaction is carried out at a temperature range of from 30 to 100° C. with a range of 40 to 60° C. being preferred. The molar ratio of the reactants is preferably 1:1 though other suitable ratios can be used.

The preferred compounds of the invention are the

N-(2-ethoxy-4-nitrobenzoyloxymethyl)-2-methyl-3,5-dinitrobenzamide,
N-(2-ethoxy-4-acetamidobenzoyloxymethyl)-2-methyl-3,5-dinitrobenzamide,
N-(2-methoxy-4-methylaminobenzoyloxymethyl)-2-methyl-2,5-dinitrobenzamide,
N-(2-methoxy-4-dimethylaminobenzoyloxymethyl)-2-methyl-3,5-dinitrobenzamide, and
N-(2-allyloxy-4-diethylaminobenzoyloxymethyl)-3,5-dinitrobenzamide,
N-(2-ethoxy-4-acetamidobenzoyloxymethyl)-3,5-dinitrobenzamide,
N-(2-ethoxy-4-acetamidobenzoyloxymethyl)-2-ethyl-3,5-dinitrobenzamide,
N-(2-ethoxy-4-acetamidobenzoyloxymethyl)-2-ethyl-3,5-dinitrobenzamide.

As previously indicated the compounds described herein when administered orally are effective in the treatment and prevention of coccidiosis in poultry. These compounds are conveniently fed to poultry as a component of the feed or drinking water of the animals although they may also be administered orally dispersed or admixed with other carriers or diluents. According to one aspect of the invention, novel compositions are provided in which a N-benzoyloxymethyl benzamide is present as an anticoccidial ingredient. Such compositions comprise N-benzoyloxymethyl benzamides intimately dispersed in or admixed with an inert carrier or diluent. By inert carrier is meant one that is substantially non-reactive with respect to the N-benzoyloxymethyl benzamide and that may be administered orally with safety to the animals. The preferred compositions of this type, that is, where the N-benzoyloxymethyl benzamide is present as an anti-coccidial ingredient, are those in which the active ingredient is intimately dispersed or suspended in or admixed with the normal elements of poultry sustenance. By normal elements of poultry sustenance is meant the feed and drink normally partaken by the poultry such as grain, water and/or other liquids. However, as indicated above, compositions comprising a N-benzoyloxymethyl benzamide intimately dispersed in or admixed with any carrier or diluent which is substantially inert with respect to the N-benzoyloxymethyl benzamide, orally ingestable and tolerated by the animals, may be satisfactorily employed.

The amount of N-benzoyloxymethyl benzamide required for control of coccidiosis in poultry will, of course, vary somewhat with the specific compound or compounds employed. In general, the compounds of this invention are effective in preventing the disease without intolerable toxic effect when administered at levels of less than about 0.05% by weight of the feed. With the preferred compounds of the invention i.e., the N-(2-ethoxy-4-nitrobenzoyloxymethyl)-2-methyl-3,5-dinitrobenzamide and N-(2-ethoxy-4-acetamidobenzoylmethyl)-2-methyl-3,5-dinitrobenzamide, good prophylactic results are obtained when from about 0.0005% to about 0.05% by weight of the total feed consumed is administered; for most satisfactory results it is preferred that the poultry feed contain between about 0.0025% and 0.025% by weight of N-benzoyloxymethyl benzamide. When the N-benzoyloxymethyl benzamides are to be employed as therapeutic agents, the higher levels are used for relatively short periods of time. Thus, concentrations of about 0.02% to 0.05% by weight of the feed may be advantageously administered in treating an established outbreak of coccidiosis. When these compounds are employed as therapeutic agents it is desirable to employ the lowest levels that afford fully adequate control of coccidiosis in order to eliminate as far as possible any risk of side effects that might appear on prolonged feeding of the compound.

In the preparation of solid compositions a uniform dispersion of admixture of the N-benzoyloxymethyl benzamide throughout the carrier can be readily effected by the usual methods of grinding, stirring, milling or tumbling. By altering the amount of drug added, and the carrier used, compositions of varying concentrations may be made to suit any purpose.

Many of these N-benzoyloxymethyl benzamides are desirably or advantageously administered to poultry by way of the drinking water of the birds. This method of treatment is often employed in the therapeutic use of our compounds since poultry with coccidiosis are apt to consume less solid feed than normal birds. When the active agents are administered by way of the drinking water, somewhat lower levels than those in feed will be satisfactory since the birds drink about twice as much as they eat. The use of the active agent in drinking water is made particularly useful by addition to the water of a suspending agent such as acacia, tragacanth, Veegum (colloidal magnesium-aluminum silicate, R. E. Vanderbilt Co.), carboxypolymethylene, algins, methylcellulose, hydroxyethylcellulose and others. This promotes even distribution of the water insoluble material.

According to another aspect of the invention, novel compositions are provided in which the active ingredient is present in relatively large amounts and which are suitable for addition to the poultry feed either directly or after an intermediate dilution or blending step. These compositions which are commonly referred to in the art as feed supplements and are a preferred feature of this invention provide a more convenient way of obtaining a uniform distribution in the feed of relatively small amounts of the active ingredient required for an effective dosage. Any orally ingestable solid carrier which is substantially inert with respect to the N-benzoyloxymethyl benzamide and tolerated by the animals may be satisfactorily employed. Examples of carriers or diluents suitable for such compositions are solid orally ingestable carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The N-benzoyloxymethyl benzamides are intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 1% to about 40% by weight, and preferably from about 2–25% by weight of active ingredient are particularly suitable for addition to poultry feed, and compositions containing from about 5–15% by weight of coccidostat are very satisfactory. The active compound is normally dispersed or mixed uniformly in the diluent but in some instances may be adsorbed on the carrier. The optimal concentration of coccidostat in these feed supplements will depend to some extent on the particular compound employed. Since it is convenient for the feed manufacturer to use about one pound of feed supplement for each ton of finished feed, the preferred concentration of any one of our coccidostats in a feed supplement is partly a function of the level of active ingredient desired in the finished feed.

The preparation of representative compounds and compositions containing such compounds is more fully described in the following examples. However, these examples are illustrative and are not to be considered as limiting the invention.

EXAMPLE 1

N-(2-ethoxy-4-nitrobenzoyloxymethyl)-2-methyl-
3,5-dinitrobenzamide (a) N-hydroxymethyl-2-methyl-3,5-dinitrobenzamide Eighty grams (0.355 mole) of 3,5-dinitrotoluamide is dissolved in 500 ml. of dimethylformamide. The solution is treated with 95 ml. of a 37% formaldehyde solution and heated for two hours. The mixture is cooled, diluted with 700 ml. water and left standing for a few days. The N-hydroxymethyl-2-methyl-3,5-dinitrobenzamide product is filtered, washed with water and dried (45.5 g.–M.P. 169–173° C.).

(b) 2-methyl-3,5-dinitrobenzamidomethyl pyridinium chloride

In a 500 ml. three-neck flask is placed N-hydroxymethyl-2-methyl-3,5-dinitrobenzamide (30.5 g.), dimethylformamide (200 ml.), pyridine (12 ml.) and benzoyl chloride (16.8 ml.). The mixture is heated with stirring on a steam bath. A precipitate begins to form in about ten minutes and the heating and stirring are continued for about one hour. After standing overnight at room temperature, the reaction mixture is filtered, the precipitate washed with dimethylformamide and ether and there is obtained 30.5 g. of the desired pyridinium chloride, a heavy white precipitate which has a melting point of 241 to 243° C.

(c) N-(2-ethoxy-4-nitrobenzoyloxymethyl)-
2-methyl-3,5-dinitrobenzamide

Five grams of 2-ethoxy-4-nitrobenzoic acid is treated with 2.0 grams of $NaHCO_3$ in 100 ml. of water. The resulting solution is filtered and then concentrated to a residue. The residue is slurried in acetone and filtered. The cake is washed with more acetone and with ether. On drying it weighed 5.2 grams (22.3 millimoles, 94% conversion).

The sodium salt of 2-ethoxy-4-nitrobenzoic acid obtained is suspended in 250 ml. of acetone and treated with 7.86 grams of 2-methyl-3,5-dinitrobenzamidomethyl pyridinium chloride. The mixture is refluxed with stirring for about 15 minutes. The reaction mixture is filtered and the filtrate taken to a semi-crystalline residue.

The residue is boiled in 50 ml. of methanol and filtered. The cake is washed with methanol and with ether. On drying it weighed 7.0 grams (70%) M.P. 202° C.

A dried sample analysis is as follows:

Calculated: C, 48.22; H, 3.60; N, 12.50. Found: C, 49.10; H, 3.64; N, 12.34.

Six pounds of N-(2-ethoxy-4-nitrobenzoyloxymethyl)-2-methyl-3,5-dinitrobenzamide is uniformly mixed with 94 pounds of wheat standard middlings. The resulting feed supplement contains 6% active ingredient. One pound of this supplement uniformly mixed with 3,000 pounds of poultry feed produces a feed composition containing 0.002% active ingredient.

EXAMPLE 2

N-(2-ethoxy-4-acetamidobenzoyloxymethyl)-2-methyl-
3,5-dinitrobenzamide

In a 250 ml. three-neck flask, 2.2 grams of 2-ethoxy-4-acetamidobenzoic acid in 150 ml. of acetone is treated with 3.52 grams of 2 - methyl - 3,5-dinitrobenzamidomethyl pyrodinium chloride as obtained in Example 1. There is then added 450 mg. of 50% sodium hydroxide and the resulting mixture is heated with stirring on a steam bath for ten minutes. The reaction mixture is filtered and the solvent removed from the filtrate until a semicrystalline residue is obtained. The residue is recrystallized from dimethylformamide, ethyl alcohol and water to yield the desired N-(2 - ethoxy-4-acetamidobenzoyloxymethyl) - 2 - methyl - 3,5 - dinitrobenzamide having a melting point of 157–158° C. Further recrystallization from ethyl alcohol alone gave a practically white product having a M.P. of 169–170° C.

Calculate for $C_2OH_2ON_4O_9$: C, 52.17; H, 4.38; N, 12.17. Found: C, 52.68; H, 4.63; N, 12.19.

Ten pounds of N - (2 - ethoxy - 4 - acetamidobenzoyloxymethyl) - 2 - methyl - 3,5 - dinitrobenzamide is uniformly mixed with 90 pounds of corn distillers' grains. The resulting feed supplement contains 10% active ingredient. One pound of this supplement uniformly mixed with one ton of poultry feed produces a feed composition containing 0.05% active ingredient.

EXAMPLE 3

N-(2-ethoxy-4-acetamidobenzoyloxymethyl)-2-ethyl-
3,5-dinitrobenzamide

Proceeding in the manner described in Example 1, 2 - ethyl - 3,5 - dinitrobenzamide dissolved in dimethylformamide is treated with a 37% formaldehyde solution and N - hydroxymethyl - 2 - ethyl - 3,5 - dinitrobenzamide is obtained which is then reacted with pyridine in the presence of benzoyl chloride to give 2 - ethyl - 3,5-dinitrobenzamidomethyl pyridinium chloride. Proceeding in the manner described in Example 1, 2 - ethyl - 3,5-dinitrobenzamidomethyl pyridinium chloride is reacted with 2 - ethoxy - 4 - acetamidobenzoic acid to produce N - (2 - ethoxy - 4 - acetamidobenzoyloxymethyl)-2-ethyl-3,5-dinitrobenzamide.

EXAMPLE 4

N-(2-ethoxy-4-dimethylaminobenzoyloxymethyl)-2-
methyl-3,5-dinitrobenzamide

Proceeding in the manner described in Example 1, 2-methyl - 3,5 - dinitrobenzamidomethyl pyridinium chloride is reacted with 2 - ethoxy - 4 - dimethylaminobenzoic acid to produce N - (2 - ethoxy - 4 - dimethylaminobenzoyloxymethyl) - 2 - methyl-3,5-dinitrobenzamide.

EXAMPLE 5

N-(2-ethoxy-4-diethylaminobenzoyloxymethyl)-2-
methyl-3,5-dinitrobenzamide

Proceeding in the manner described in Example 1, 2-methyl - 3,5 - dinitrobenzamidomethyl pyridinium chloride is reacted with 2 - ethoxy - 4 - diethylaminobenzoic acid to produce N - (2 - ethoxy - 4 - diethylaminobenzoyloxymethyl)-2-methyl-3,5-dinitrobenzamide.

EXAMPLE 6

N-(2-ethoxy-4-methylaminobenzoyloxymethyl)-2-
methyl-3,5-dinitrobenzamide

Proceeding in the manner described in Example 1, 2-methyl - 3,5 - dinitrobenzamidomethyl pyridinum chloride is reacted with 2 - ethoxy - 4 - methylaminobenzoic acid to produce N - (2 - allyloxy - 4 - acetamidobenzobenzoyloxymethyl) - 2 - methyl - 3,5-dinitrobenzamide.

EXAMPLE 7

N-(2-allyloxy-4-acetamidobenzoyloxymethyl)-2-
methyl-3,5-dinitrobenzamide

Proceeding in the same manner as in Example 2, 2-methyl - 3,5 - dinitrobenzamidomethyl pyridinium chloride is reacted with 2 - allyloxy - 4 - acetamidobenzoic acid to produce N - (2 - allyloxy - 4 - acetamidobenzoyloxymethyl)-2-methyl-3,5-dinitrobenzamide.

EXAMPLE 8

N-(2-ethoxy-4-acetamidobenzoyloxymethyl)-3,5-
dinitrobenzamide

Proceeding in the manner described in Example 2, 3,5 - dinitrobenzamidomethyl pyridinium chloride is reacted with 2 - ethoxy - 4 - acetamidobenzoic acid to produce N - (2 - ethoxy - 4 - acetamidobenzoyloxymethyl)-3,5-dinitrobenzamide.

EXAMPLE 9

N-(2-methoxy-4-acetamidobenzoyloxymethyl)-2-ethyl-3,5-dinitrobenzamide

Proceeding in the manner described in Example 3, 2-ethyl - 3,5 - dinitrobenzamide is prepared and then proceeding in the manner described in Example 1, 2 - ethyl-3,5 - dinitrobenzamidomethyl pyridinium chloride is reacted with 2 - methoxy - 4 - acetamidobenzoic acid to produce N - (2 - methoxy - 4 - acetamidobenzoyloxymethyl)-2-ethyl-3,5-dinitrobenzamide.

Any departure from the description which conforms to the present invention is intended to be included within the scope of the claims.

We claim:

1. Compound of the general formula:

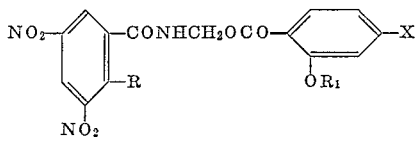

wherein R is a member selected from the group consisting of hydrogen and lower alkyl radicals, $R_1$ is a member selected from the group consisting of lower alkyl and lower alkenyl radicals and X is a member selected from the group consisting of nitro, loweralkylamino, diloweralkylamino and acetamido radicals.

2. N-(2 - ethoxy - 4-nitrobenzoyloxymethyl-2-methyl-3,5-dinitrobenzamide.

3. N - (2 - ethoxy-4-acetamidobenzoyloxymethyl)-2-ethyl-3,5-dinitrobenzamide.

4. N - (2 - ethoxy - 4 - dimethylaminobenzoyloxymethyl) - 2 - methyl - 3,5 - dinitrobenzamide.

5. N - (2 - ethoxy - 4 - diethylaminobenzoyloxymethyl)-2-methyl-3,5-dinitrobenzamide.

6. N - (2 - ethoxy - 4 - methylaminobenzoyloxymethyl)-2-methyl-3,5-dinitrobenzamide.

7. N - (2 - allyloxy - 4 - acetamidobenzoyloxymethyl)-2-methyl-3,5-dinitrobenzamide.

8. N - (2 - ethoxy - 4 - acetamidobenzoyloxymethyl)-3,5-dinitrobenzamide.

9. N - (2 - methoxy - 4-acetamidobenzoyloxymethyl)-2-ethyl-3,5-dinitrobenzamide.

10. The process which comprises reacting a pyridinium compound of the formula:

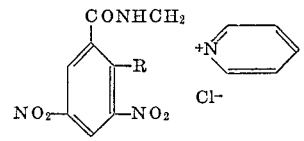

wherein R is a member selected from the group consisting of hydrogen and a lower alkyl radical with a benzoic acid derivative of the formula:

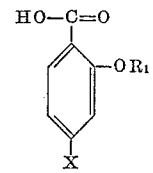

wherein $R_1$ is a member selected from the group consisting of a lower alkyl and a lower alkenyl radical and X is a member selected from the group consisting of nitro, lower - alkylamino, diloweralkylamino and acetamido radicals to form a N-benzoyloxymethyl benzamide of the formula:

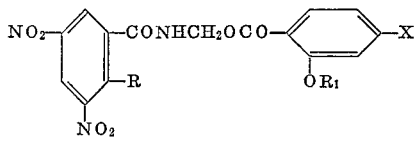

wherein R, $R_1$ and X are as defined above.

References Cited

Society for Experimental Biology and Medicine, vol. 117, October to December 1964.

LORRAINE A. WEINBERGER, *Primary Examiner.*

A. THAXTON, *Assistant Examiner.*

U.S. Cl. X.R.

260—295, 558; 424—324